William Joseph Metrailer
William David McCain, Jr. Inventors

By L. Chasan Attorney

United States Patent Office 2,952,619
Patented Sept. 13, 1960

2,952,619

FEED INJECTOR FOR COKING FOR CHEMICALS

William Joseph Metrailer and William David McCain, Jr., Baton Rouge, La., assignors to Esso Research and Engineering Company, a corporation of Delaware Filed Jan. 11, 1957, Ser. No. 633,732

3 Claims. (Cl. 208—157)

The present invention relates to a method and apparatus for the introduction of hydrocarbon oils. More particularly, it is concerned with the injection of residuum feed into a high velocity, relatively dilute solids stream such as that employed in transfer line coking of heavy oils for the production of olefins, diolefins and other light hydrocarbon products.

This application is a continuation-in-part of the application, Serial Number 381,943, filed September 23, 1953, now Patent No. 2,891,000.

Conversion of heavy hydrocarbon oils in a transfer line reaction zone is well known in the art. In this process, a suitably preheated oil is fed into a rapidly moving stream of hot, substantially catalytic inert, particulate solids, normally at temperatures of about 1200° to 1600° F. Upon contact with these high temperature particles, the oil charge is converted into lighter distillates, valuable chemical intermediates, and carbonaceous material which is continuously deposited on the contact solids. After removing the solids from gaseous product streams, generally at least a portion of the coated solids are then circulated to a combustion zone wherein oxidation of the carbon deposits serves to heat the solids to requisite high temperature for residuum conversion.

Hydrocarbon oil feeds suitable for such a process include heavy crudes, atmospheric and vacuum crude bottoms, pitch and asphalt or other heavy hydrocarbon residua or mixtures thereof. The contact solids are preferably coke particles, although sand, metal shot, silica, glass beads, ceramics, etc. may be suitably employed.

In order to successfully operate a transfer line reactor, proper contact between the oil feed and the flowing contact particles must be achieved. The problem of proper introduction of hydrocarbon feed is particularly critical in such a dispersed phase reaction zone. In normal operations, the solids density within the reactor may only be of the order of 0.5 to 10 lbs./ft.$^3$. The particles, suspended in a propellant gas stream, are traveling at velocities of about 10 to 100 ft./sec., thereby permitting contact times of only approximately 0.1 to 5.0 seconds. Hence, in view of the relative scarcity of contact solids and the short reaction times, it becomes necessary to introduce the hydrocarbon feed in a highly uniform, well dispersed manner in order to obtain efficient conversion to desired products.

In the past, numerous conventional methods of feed injection have been used with little success. By way of example, an oil jet was not found to give sufficient dispersion across the entire volume of a reactor conduit. Similarly, mere multiple injections of feed may not give proper contact with the rapidly flowing solids.

According to the present invention, it has been found that a substantially uniform dispersion of fine particles is obtained by injecting the oil particles in a highly specific manner. Prior to injection, a centrifugally outward component of motion is imparted to the oil feed, thereby forming a hollow film along the walls of the discharge port. As the oil is introduced into the reaction zone, a high velocity gas jet is passed across the liquid film at an approximately right angle, shearing it and atomizing the oil into relatively minute particles. The fog of fine droplets thus created provides for uniform contact between the feed and the relatively dispersed, high velocity solids.

The invention will be more fully and clearly understood with reference to the following description, drawing and accompanying example.

Figure 1:
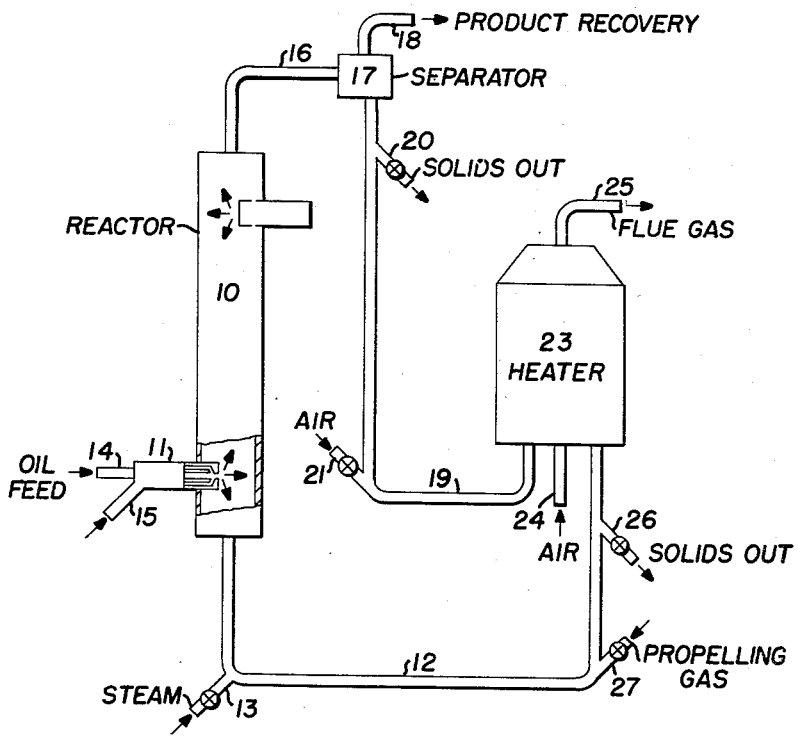
Figure 1 illustrates a transfer line reaction system employing the feed means of the present invention.

Referring to Figure 1, there is shown a transfer line reactor 10 and heater vessel 23. Hot coke particles, averaging between 40 to 400 microns in size and at a temperature of about 1400° F., are supplied from heater 23 to the short contact time reaction zone through conduit 12. Propelling gas, such as steam or light hydrocarbons, admitted into conduit 12 by means of lines 13 and 27 serve to carry, at relatively high velocity, the heated particles to reactor 10, wherein they are contacted with hydrocarbon oil feed. The feed, a vacuum residuum, having an initial boiling point above about 700° F., has been preheated to a temperature of 350° F. The oil is injected into reactor 10 by feed nozzles 11 at an overall rate of 100 bbl./day, as will later be described in detail.

Within the reactor, the dilute suspension of coke particles has a density of 8 lb./ft.$^3$ and is flowing at a velocity of 30 ft./sec. The reactor, 6 ft. in length, when considered with the solids separating device, permits a residence time of about 0.5 sec.

The solids stream, along with gaseous conversion products formed from the pyrolysis of the oil feed, pass out of the reactor by line 16 and are sent to separator or cyclone 17. The separated vaporous material is withdrawn overhead through line 18 and subjected to further product recovery treatment, such as scrubbing, fractionation, crystallization, etc., not shown. Solids are then circulated to heater 23 through conduit 19. Coke product may be removed from the system by means of line 20, or if desired, first heated and then withdrawn by line 26.

Air, admitted into conduit 19 by line 21, serves both to circulate the separated solids and as a secondary supply of oxygen for heater 23. The major portion of the requisite oxidizing gas is supplied directly to the heater through line 24. Coke particles are subject to combustion and thus heated to a temperature of about 1600° F. They are then withdrawn and recirculated to reactor 10 wherein the coke serves as requisite contact particles for the conversion of oil feed. Flue gas is removed overhead by line 25, and may be subjected to conventional heating exchanging methods to recover its sensible heat for further use.

Referring back to the introduction of the oil feed, the feed means consists of one or more, preferably several, feed nozzles 11. As shown in Figure 1, two nozzles project into reactor 10 at different vertical levels. The number and position of the nozzles may of course vary according to the length of the reactor, desired reaction times, etc. Oil is introduced by line 14 into inner passageway 30 and steam, light hydrocarbons, $CO_2$, or other suitable gases admitted into channel 33 through line 15.

Figure 2:
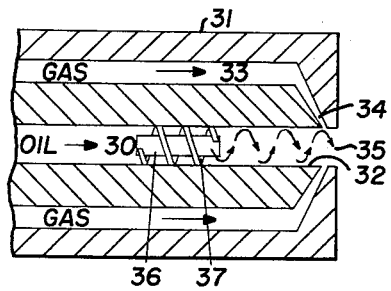
Figure 2 is an enlarged cross-section sectional view of one of the nozzles shown in Figure 1.

Figure 2 shows feed nozzle 11 in greater detail. Annular chamber 31 encompasses passageway 30, thereby forming channel 33. Steam supplied to channel 33 at a temperature of 350° F., helps to maintain the temperature of the oil stream in addition to serving as a shearing gas. Flow restricting structure 36 having a grooved circumferential surface defines a threaded passageway for the flowing oil. As the oil passes through grooves 37, a spinning component of motion is imparted to the oil stream forcing it outwards as a hollow, cylindrical film along the wall 32 of the passageway.

At the terminal portion 35 of the passageway, the film is cut at an angle of about 90° by one or more jets of stream at a velocity of 250 ft./sec., thus shearing and atomizing the oil into relatively uniform fine droplets. The oil particles thus formed are less than 175 microns in size and average 30 to 100 microns. Constricting passageway 34 permits the requisite high velocity jets to be obtained while maintaining a fairly low gas/oil weight ratio of about 0.05. Since the cross section of the reactor 10 is generally small, the oil is dispersed into the reaction zone with a fairly low forward velocity of generally less than 50 ft./sec. within six inches of the discharge port.

The forward velocity and the angle of dispersion of the atomized oil droplets as they are admitted into the reactor are readily altered by varying the angle at which the gas jet cuts the liquid film. An angle of approximately 90° is normally preferred.

It should be understood that the present invention is not limited to the particular means shown for forming the oil film prior to atomization. Other structures, apparent to those skilled in the art, such as cone with its apex oppositely directed to the flow of oil, may be readily employed. Alternately, the liquid film may be formed by tangentially injecting the oil at a high velocity into the inner passageway of the nozzle.

The following table, with reference to the drawing, summarizes pertinent conditions in a preferred embodiment of the present invention.

*Table 1*

| Transfer Line Reactor | Broad Range | Preferred Range |
|---|---|---|
| Temperature of Incoming Solids, °F | 1200–1600 | 1350–1550 |
| Average Solids Size, microns | 40–800 | 150–200 |
| Temperature of Reaction, °F | 1100–1600 | 1200–1400 |
| Density of Solids Suspension in Reactor, lb./ft.$^3$ | 0.5–10 | 5–8 |
| Average Residence Time of Solids in Reactor, Sec. | 0.1–0.5 | 0.25–0.50 |
| Oil-Injection Nozzle: | | |
| Overall Feed Oil Rate, bbls./day | 50–500 | 50–100 |
| Temperature of Oil Feed, °F | 300–700 | 350–650 |
| Gas/oil Feed Ratio by Weight | 0.01–0.07 | 0.03–0.05 |
| Velocity of Shearing Gas Jet, ft./sec. | 200–1200 | 250–850 |
| Cutting Angle of Gas Jet | 55–105 | 65–90 |
| Forward Velocity of Feed 6″ After Discharge, ft./sec. | 20–60 | 30–50 |
| Average Liquid Droplet Size, microns | 30–100 | 50–60 |

While the above description has been limited to the injection of feed to transfer line reactors, the present feed means may find application wherever it is desired to introduce a liquid as a well dispersed fog of fine particles.

By forming a liquid film and subjecting it to shearing and atomization by a high velocity gas jet, smaller and more uniform oil droplets are produced. The feed is homogeneously distributed across the entire reaction zone, thereby promoting good contact with reaction solids and efficient conversion to lighter products.

Having described this invention, what is sought to be protected by Letters Patent is succinctly set forth in the following claims.

What is claimed is:

1. A process for coking high boiling hydrocarbon oils which comprises passing a dilute gaseous suspension of catalytically inert hot finely divided solids of up to 8 lbs. per cubic foot density upwardly through a transfer line reaction zone, preheating hydrocarbon oil feed, passing said preheated oil stream through a confined straight axial passageway terminating in an orifice within said reaction zone and within said dilute suspension of solids and imparting centrifugal force to a portion of said oil stream to form a hollow cylindrical oil film moving along the inner wall of said axial passageway adjacent and toward its outlet end, passing gasiform material through a confined annular passageway surrounding said axial passageway and then through a constricting passageway directed toward said orifice to produce a high velocity jet of gasiform material transversely across said hollow cylindrical oil film leaving said orifice to atomize said oil film into a fog of oil droplets and to disperse said oil droplets in said reaction zone and on the hot catalytically inert finely divided solids passing upwardly through said reaction zone so that cracking and coking of said hydrocarbon oil are effected by contact with said hot inert solids.

2. A process according to claim 1 wherein the velocity of the upflowing suspension of hot inert solids in said reaction zone is at least about 10 feet per second and the hot inert solids comprise coke particles maintained at a temperature between about 1200° and 1600° F. and the jet of gasiform material leaving said constricted passageway is at a velocity between about 200 and 1200 feet per second.

3. The process of claim 1 wherein the weight ratio of shearing gasiform material to hydrocarbon oil is 0.01 to 0.07 and wherein the forward velocity of the fine oil droplets is between 20 to 60 ft. per second as measured six inches from the point of discharge into said reaction zone.

References Cited in the file of this patent

UNITED STATES PATENTS

| | | |
|---|---|---|
| 2,303,104 | Abbey | Nov. 24, 1942 |
| 2,325,495 | Ferguson | July 27, 1943 |
| 2,595,759 | Buckland et al. | May 6, 1952 |
| 2,659,663 | Heller | Nov. 17, 1953 |
| 2,768,127 | Kimberlin et al. | Oct. 23, 1956 |
| 2,780,586 | Mader | Feb. 5, 1957 |
| 2,786,742 | McKinley et al. | Mar. 26, 1957 |
| 2,786,801 | McKinley et al. | Mar. 26, 1957 |
| 2,881,130 | Pfeiffer et al. | Apr. 7, 1959 |

FOREIGN PATENTS

| | | |
|---|---|---|
| 658,594 | Great Britain | Oct. 10, 1951 |
| 1,116,495 | France | May 8, 1956 |